United States Patent Office 2,856,438
Patented Oct. 14, 1958

2,856,438

PURIFICATION PROCESS

Andrew Procko, New Martinsville, W. Va., assignor to Columbia-Southern Chemical Corporation, a corporation of Delaware No Drawing. Application February 1, 1956
Serial No. 562,657

5 Claims. (Cl. 260—650)

The present invention deals with the treatment of orthodichlorobenzene, and more particularly is directed to the removal of contaminants present in orthodichlorobenzene by treatment with titanium tetrachloride.

Orthodichlorobenzene frequently contains contaminants which for any of a number of reasons are undesirable. According to the present invention, a noval process for removing the contaminants is provided which is both expeditious and simple.

It has now been discovered that when orthodichlorobenzene containing contaminants which are apparently incident to the normal production thereof is heated with a minor quantity of titanium tetrachloride, removal of the contaminants results. A black sludge representing contaminants converted to a readily separable form appears after heating orthodichlorobenzene with titanium tetrachloride, say to a temperature of at least about 50° C. Thereafter, this black sludge is separated and the resulting orthodichlorobenzene is free from the specified contaminants.

The formation of a readily removable black sludge as is hereby obtained appears unique with orthodichlorobenzene. Even closely related chlorinated benzenes and benzene are not apparently susceptible of purification according to this process.

In one embodiment, a liquid body of the impure orthodichlorobenzene is heated to reflux in the presence of a minor quantity of titanium tetrachloride, usually about 0.5 to 5 percent or sometimes 10 percent titanium tetrachloride by weight. Refluxing is continued until darkening of the liquid body is essentially complete. Temperatures corresonding approximately to the boiling point of orthodichlorobenzene under the pressure conditions of reflux, e. g. approximately 180° C. at atmospheric refluxing, are suitable. After formation of a black sludgy material throughout the liquid is substantially complete, refluxing is discontinued. Upon cooling, the sludge settles and is thereafter removed by recognized expedients for separating solids from liquids.

After formation of the black sludge is substantially complete, e. g. until no further darkening and formation of black solids in the liquid is discernible, refluxing is discontinued and distillation of the orthodichlorobenzene may be employed in lieu of mechanically separating the black sludge. Should some titanium tetrachloride be present, the foreshot of the distillation comprising but a minor portion of the total distillate will contain this titanium tetrachloride. This foreshot may be returned to a further purification treatment comprising a portion of the titanium tetrachloride.

The following example illustrates the manner in which the present invention may be practiced:

*Example 1*

A 500 millimeter round-bottom, boiling flask was charged with 200 grams of an orthodichlorobenzene composition and 10 grams of titanium tetrachloride. This composition contained 86 percent by weight of orthodichlorobenzene, the balance being distributed primarily among other dichlorobenzene normally obtained in the dichlorination of commercial grade benzene. About 0.3 percent by weight of the orthodichlorobenzene was contaminants, believed to be thiophene and/or its chlorinated derivatives such as dichlorothiophene. The titanium tetrachloride was of high purity, having been purified by a known procedure and fractionally distilled.

Attached to the flask was a water-cooled condenser, the top of which was fitted with a ball joint T adaptor. By means of this adaptor, a constant nitrogen purge was maintained on the system between 4 to 6 pounds per square inch gauge. With the nitrogen purge in operation, the contents of the flask were heated gradually and within 15 minutes a noticeable darkening in the mixture occurred. Heating was continued until the liquids were refluxing. During such heating and refluxing, a black sludge in the liquid contents was in evidence. After refluxing for some 2 hours at 183° C., heating was stopped and the liquid contents cooled whereupon black sludge settled to the flask bottom. This sludge was then separated from the liquid, leaving high purity orthodichlorobenzene, which by simple distillation was separated from any possible remaining titanium tetrachloride.

The foregoing example was duplicated, limiting the reflux to one hour with equally effective purification. The actual heating period is widely variable. Usually from several minutes to one or more hours are adequate to insure the formation of substantially all the sludge that is possible. Reflux times of one hour have been found preferably suitable.

Orthodichlorobenzene treated in accordance with this process is of particularly high purity. Once treated properly, further subsequent heating of the orthodichlorobenzene in the presence of titanium tetrachloride is not accompanied by blackening and formation of the sludge, thus indicating essentially complete contaminant removal.

Because of this, orthodichlorobenzene so purified is ideal for uses which involve intended and coincidental contact with titanium tetrachloride. Thusly treated, orthodichlorobenzene is therefore useful as a heat transfer medium in heat exchanges designed for titanium tetrachloride. In its manufacture, gaseous titanium tetrachloride must be cooled and condensed. Orthodichlorobenzene hereby treated is an excellent coolant and any coincidental leaking which commingles the two will not clog up apparatus and cause shutdowns.

Orthodichlorobenzene compositions which have been found particularly susceptible to this treatment are usually comprised of isomeric mixtures of dichlorobenzene containing a preponderant concentration of the orthodichlorobenzene isomer. That is, dichlorobenzene compositions containing from 70 to 95 percent orthodichlorobenzene are normally employed. The majority of such dichlorobenzene compositions are the result of chlorinating benzene or monochlorobenzene. The dichlorinated mixture may even be partially treated as by fractional distillation to concentrate the orthodichlorobenzene concentration.

It appears that the contaminant which is removed by the present invention is a sulphur-containing organic such as thiophene and/or chlorinated thiophene such as dichlorothiophene. Contaminant concentrations in the orthodichlorobenzene are on the order of 0.1 to 0.6 percent by weight of the dichlorobenzene composition. It may well be that the contaminants are mainly thiophene or other sulphur-containing organic materials present in many of the commercial grade benzenes and/or any corresponding chlorinated sulphur-containing organic materials as may be provided during the chlorination of the benzene to dichlorobenzene.

It is recommended that anhydrous or essentially anhydrous conditions be observed, lest the titanium tetrachloride hydrolyse completely to titanium dioxide before purification and sludge formation is completed. To this end, the orthodichlorobenzene is usually essentially free from water, e. g. of a moisture content below 500 parts per million and preferably below 100 parts per million. As an added precautionary measure, the refluxing system may be subjected to a constant purge with an inert gas such as nitrogen to minimize the possibility of water in the system. Of course, the presence of water will not interfere with the treatment insofar as adequate titanium tetrachloride is available to compensate for any which may be lost due to hydrolysis. In the event anhydrous conditions are not present, somewhat higher titanium tetrachloride quantities are consumed.

Although the present invetnion has been described in terms of specific details of certain embodiments, it is not intended that the invention be considered as limited thereto except insofar as they appear in the appended claims.

I claim:

1. A method of treating orthodichlorobenzene which comprises heating impure orthodichlorobenzene containing contaminants incidental to the production of orthodichlorobenzene by dichlorination of benzene with titanium tetrachloride in a liquid body until a black sludge is formed and thereafter removing such sludge.

2. A method of treating orthodichlorobenzene compositions containing from 70 to 95 percent orthodichlorobenzene by weight of the dichlorobenzenes comprising said composition and containing contaminants incidental to the production of orthodichlorobenzene by dichlorination of benzene, which comprises heating said composition with titanium tetrachloride, continuing said heating until a black sludge forms and thereafter removing said sludge.

3. A method of treating orthodichlorobenzene contaminated with a compound selected from the group consisting of thiophene and the chlorinated derivatives of thiophene which comprises heating said orthodichlorobenzene with titanium tetrachloride until a black sludge forms and thereafter removing said sludge.

4. A method of treating impure orthodichlorobenzene containing contaminants incidental to the production of orthodichlorobenzene by dichlorination of benzene which comprises heating said orthodichlorobenzene with from between 0.5 and 5 percent titanium tetrachloride by weight, continuing said heating until a black sludge forms and thereafter removing said sludge.

5. The method of claim 4 wherein the heating comprises refluxing a liquid mixture of the orthodichlorobenzene and titanium tetrachloride.

No references cited.